(12) United States Patent
Hernandez

(10) Patent No.: US 7,743,002 B2
(45) Date of Patent: Jun. 22, 2010

(54) METHOD AND SYSTEM FOR TESTING OF POLICIES TO DETERMINE COST SAVINGS

(75) Inventor: Rick Hernandez, Palo Alto, CA (US)

(73) Assignee: Rearden Commerce, Inc., Foster City, CA (US)

( * ) Notice: Subject to any disclaimer, the term of this patent is extended or adjusted under 35 U.S.C. 154(b) by 1193 days.

(21) Appl. No.: 11/240,740

(22) Filed: Sep. 30, 2005

(65) Prior Publication Data

US 2006/0190314 A1 Aug. 24, 2006

Related U.S. Application Data

(63) Continuation-in-part of application No. 11/067,537, filed on Feb. 24, 2005.

(51) Int. Cl.
*G06F 17/00* (2006.01)
(52) U.S. Cl. .............................. 705/400; 705/6; 700/14
(58) Field of Classification Search .................... 705/5, 705/400, 55–10; 700/14; 702/176, 178, 702/187; 706/25, 47
See application file for complete search history.

(56) References Cited

U.S. PATENT DOCUMENTS

| | | | |
|---|---|---|---|
| 5,191,523 A | | 3/1993 | Whitesage |
| 5,237,499 A | * | 8/1993 | Garback ......................... 705/5 |
| 5,319,542 A | | 6/1994 | King et al. |
| 5,331,546 A | | 7/1994 | Webber et al. |
| 5,475,740 A | | 12/1995 | Biggs et al. |
| 5,570,283 A | | 10/1996 | Shoolery et al. |
| 5,655,008 A | | 8/1997 | Futch et al. |
| 5,799,286 A | | 8/1998 | Morgan et al. |
| 5,819,092 A | | 10/1998 | Ferguson et al. |
| 5,832,451 A | | 11/1998 | Flake et al. |
| 5,832,453 A | * | 11/1998 | O'Brien ......................... 705/6 |
| 5,839,114 A | | 11/1998 | Lynch et al. |

(Continued)

FOREIGN PATENT DOCUMENTS

CA 2291463 6/2001

(Continued)

*Primary Examiner*—Andrew Joseph Rudy
(74) *Attorney, Agent, or Firm*—Greenberg Traurig, LLP

(57) ABSTRACT

Method and system for testing policies to determine cost savings, which in one embodiment comprises receiving identities of a set of one or more persons associated within an organization, the one or more person's travel related expenditures are to be governed by at least a first and second policy; from the set of one or more persons, identifying a first group governed by the first policy and identifying a second group governed by the second policy; identifying the travel costs incurred by the first group and costs incurred by the second group; and following the passage of a predetermined period of time, in view of the respective separate policies, performing a cost analysis on travel costs incurred by the first group during the predetermined period of time and the travel costs incurred by the second group during the predetermined period of time.

19 Claims, 3 Drawing Sheets

OTHER PUBLICATIONS

Aggarwal, Gautam et al., U.S. Appl. No. 11/319,911, entitled "Method and System for Ranking Services on a Variable Scale of Compliance", filed Dec. 27, 2005.

(Continued)

U.S. PATENT DOCUMENTS

| | | | |
|---|---|---|---|
| 5,852,812 A | 12/1998 | Reeder | |
| 5,870,721 A | 2/1999 | Norris | |
| 5,893,077 A | 4/1999 | Griffin | |
| 5,897,620 A | 4/1999 | Walker et al. | |
| 5,948,040 A * | 9/1999 | DeLorme et al. | 701/201 |
| 5,991,742 A * | 11/1999 | Tran | 705/32 |
| 6,018,715 A | 1/2000 | Lynch et al. | |
| 6,023,679 A | 2/2000 | Acebo et al. | |
| 6,029,144 A | 2/2000 | Barrett et al. | |
| 6,195,420 B1 | 2/2001 | Tognazzini | |
| 6,230,204 B1 | 5/2001 | Fleming | |
| 6,295,521 B1 | 9/2001 | DeMarcken et al. | |
| 6,304,850 B1 | 10/2001 | Keller et al. | |
| 6,411,940 B1 | 6/2002 | Egendorf | |
| 6,442,526 B1 | 8/2002 | Vance et al. | |
| 6,477,520 B1 * | 11/2002 | Malaviya et al. | 706/47 |
| 6,571,213 B1 | 5/2003 | Altendahl et al. | |
| 6,622,084 B2 | 9/2003 | Cardno et al. | |
| 6,701,311 B2 * | 3/2004 | Biebesheimer et al. | 707/5 |
| 6,711,548 B1 * | 3/2004 | Rosenblatt | 705/6 |
| 6,715,073 B1 | 3/2004 | An et al. | |
| 6,816,882 B1 | 11/2004 | Conner et al. | |
| 6,839,679 B1 | 1/2005 | Lynch et al. | |
| 6,847,988 B2 | 1/2005 | Toyouchi et al. | |
| 6,959,298 B1 | 10/2005 | Silverbrook et al. | |
| 6,959,327 B1 | 10/2005 | Vogl et al. | |
| 6,961,773 B2 | 11/2005 | Hartman et al. | |
| 6,965,868 B1 | 11/2005 | Bednarek | |
| 6,980,885 B2 | 12/2005 | Ye et al. | |
| 7,006,986 B1 | 2/2006 | Sines et al. | |
| 7,050,986 B1 * | 5/2006 | Vance et al. | 705/5 |
| 7,080,096 B1 | 7/2006 | Imamura | |
| 7,117,170 B1 | 10/2006 | Bennett et al. | |
| 7,136,821 B1 | 11/2006 | Kohavi et al. | |
| 7,139,728 B2 | 11/2006 | Rigole | |
| 7,194,417 B1 * | 3/2007 | Jones | 705/5 |
| 7,222,084 B2 | 5/2007 | Archibald et al. | |
| 7,228,313 B1 * | 6/2007 | Hand et al. | 707/104.1 |
| 7,272,568 B1 | 9/2007 | Birch et al. | |
| 7,272,626 B2 | 9/2007 | Sahai et al. | |
| 7,302,399 B1 * | 11/2007 | Donovan et al. | 705/5 |
| 7,315,824 B2 | 1/2008 | Chen et al. | |
| 7,363,267 B1 * | 4/2008 | Vincent et al. | 705/37 |
| 7,401,029 B2 * | 7/2008 | Gillespie | 705/6 |
| 7,457,950 B1 * | 11/2008 | Brickell et al. | 713/156 |
| 7,496,520 B1 | 2/2009 | Handel et al. | |
| 7,499,864 B2 * | 3/2009 | Campbell et al. | |
| 2001/0003815 A1 | 6/2001 | Nakano | |
| 2001/0051917 A1 | 12/2001 | Biaaonette et al. | |
| 2002/0010612 A1 | 1/2002 | Smith et al. | |
| 2002/0016729 A1 | 2/2002 | Breitenbach et al. | |
| 2002/0059092 A1 | 5/2002 | Naito et al. | |
| 2002/0103693 A1 | 8/2002 | Bayer et al. | |
| 2002/0120478 A1 | 8/2002 | Tanaka | |
| 2002/0152101 A1 | 10/2002 | Lawson et al. | |
| 2002/0156687 A1 | 10/2002 | Carr et al. | |
| 2003/0036930 A1 | 2/2003 | Acebo et al. | |
| 2003/0036981 A1 | 2/2003 | Vaughan et al. | |
| 2003/0040987 A1 | 2/2003 | Hudson et al. | |
| 2003/0046195 A1 | 3/2003 | Mao | |
| 2003/0078800 A1 | 4/2003 | Salle et al. | |
| 2003/0105711 A1 | 6/2003 | O'Neil | |
| 2003/0110062 A1 | 6/2003 | Mogler et al. | |
| 2003/0110136 A1 | 6/2003 | Wells et al. | |
| 2003/0120477 A1 | 6/2003 | Kruk et al. | |
| 2003/0120526 A1 | 6/2003 | Altman et al. | |
| 2003/0177045 A1 | 9/2003 | Fitzgerald et al. | |
| 2003/0182413 A1 | 9/2003 | Allen et al. | |
| 2003/0200111 A1 | 10/2003 | Damji | |
| 2003/0204474 A1 | 10/2003 | Capek et al. | |
| 2003/0229529 A1 | 12/2003 | Mui et al. | |
| 2003/0236722 A1 | 12/2003 | Kamel | |
| 2004/0044556 A1 | 3/2004 | Brady et al. | |
| 2004/0044600 A1 | 3/2004 | Chu et al. | |
| 2004/0044644 A1 | 3/2004 | Brady et al. | |
| 2004/0044673 A1 | 3/2004 | Brady et al. | |
| 2004/0044681 A1 | 3/2004 | Brady et al. | |
| 2004/0049413 A1 | 3/2004 | Momma et al. | |
| 2004/0073615 A1 | 4/2004 | Darling | |
| 2004/0117275 A1 | 6/2004 | Billera | |
| 2004/0143498 A1 | 7/2004 | Umeda | |
| 2004/0153348 A1 | 8/2004 | Garback | |
| 2004/0167808 A1 | 8/2004 | Fredericks et al. | |
| 2004/0193457 A1 | 9/2004 | Shogren | |
| 2004/0210487 A1 | 10/2004 | Fujimoto et al. | |
| 2004/0249684 A1 | 12/2004 | Karppinen | |
| 2004/0249745 A1 | 12/2004 | Baaren | |
| 2004/0260601 A1 | 12/2004 | Brief | |
| 2004/0260603 A1 | 12/2004 | Marmotta | |
| 2005/0004830 A1 | 1/2005 | Rozell et al. | |
| 2005/0033631 A1 | 2/2005 | Wefers et al. | |
| 2005/0043996 A1 | 2/2005 | Silver | |
| 2005/0060271 A1 | 3/2005 | Vig | |
| 2005/0065821 A1 | 3/2005 | Kalies | |
| 2005/0108069 A1 | 5/2005 | Shiran et al. | |
| 2005/0119809 A1 | 6/2005 | Chen | |
| 2005/0120052 A1 | 6/2005 | Miller et al. | |
| 2005/0132006 A1 | 6/2005 | Horvitz et al. | |
| 2005/0138175 A1 | 6/2005 | Kumar et al. | |
| 2005/0165629 A1 | 7/2005 | Bruns | |
| 2005/0182713 A1 | 8/2005 | Marchesi | |
| 2005/0197913 A1 | 9/2005 | Grendel et al. | |
| 2005/0197915 A1 | 9/2005 | Biwer et al. | |
| 2005/0216375 A1 | 9/2005 | Grendel et al. | |
| 2005/0273345 A1 | 12/2005 | Castillejo | |
| 2005/0283389 A1 | 12/2005 | Widjaja et al. | |
| 2006/0010023 A1 | 1/2006 | Tromczynski et al. | |
| 2006/0037016 A1 | 2/2006 | Saha et al. | |
| 2006/0059021 A1 | 3/2006 | Yulman et al. | |
| 2006/0100909 A1 | 5/2006 | Glimp et al. | |
| 2006/0101467 A1 | 5/2006 | Buco et al. | |
| 2006/0123088 A1 | 6/2006 | Simmons et al. | |
| 2006/0143087 A1 | 6/2006 | Tripp et al. | |
| 2006/0190314 A1 | 8/2006 | Hernandez | |
| 2006/0212321 A1 | 9/2006 | Vance et al. | |
| 2006/0224423 A1 | 10/2006 | Sun et al. | |
| 2006/0241966 A1 | 10/2006 | Walker et al. | |
| 2006/0283935 A1 | 12/2006 | Henry et al. | |
| 2007/0005406 A1 | 1/2007 | Assadian et al. | |
| 2007/0038566 A1 | 2/2007 | Shestakov et al. | |
| 2007/0174154 A1 | 7/2007 | Roberts et al. | |
| 2007/0239548 A1 | 10/2007 | Sears | |
| 2008/0004964 A1 | 1/2008 | Messa | |
| 2008/0065408 A1 | 3/2008 | Salonen | |
| 2008/0091481 A1 | 4/2008 | Messa | |
| 2009/0006142 A1 | 1/2009 | Orttung | |
| 2009/0125355 A1 | 5/2009 | Handel | |

OTHER PUBLICATIONS

Billington, Corey A. et al., U.S. Appl. No. 11/093,615, entitled "Cost Method Analysis and breakdown for Cost Buildup", filed Mar. 29, 2005.

Forshaw, David et al., U.S. Appl. No. 11/324,083, entitled "Method and System to Provide Cumulative Budget and Probabilites for a Return on Expenditure for Policy Enforcement," filed Dec. 29, 2005.

Gertsbakh, Ilya et al., "Periodic transportation schedules with flexible departure time. An interactive approach based on the periodic event scheduling program and the deficit function approach," European Journal of Operational Research, Feb. 15, 1991, pp. 298-309, ScienceDirect, Nov. 3, 2008 <http://www.sciencedirect.com/science/article/B6VCT>.

Handel, Sean et al., U.S. Appl. No. 11/187,484, entitled "System and Method for Optimization of Group Shipments to Reduce Shipping Costs", filed Jul. 22, 2005.

Orttung, Mark et al., U.S. Appl. No. 11/027,115, entitled Apparatus and Method to Provide Community Pricing, filed Dec. 30, 2004.

Orttung, Mark et al., U.S. Appl. No. 11/178,033, entitled "Flexible Policy Application to Reduce Travel Costs", filed Jul. 7, 2005.

Patwardhan, Shantau et al., U.S. Appl. No. 11/066,022, entitled System and Method for Flexible Handling of Rules and Regulations in Temporary Labor Hiring, filed Feb. 24, 2005.

Website: "Tax Consequences of Frequent Flyer Mileage Earned on Business Travel", <http://www.ssbb.com/freqfly.html>, Satterlee Stephens Burke & Burke LLP, May 1997, printed Nov. 3, 2008.

Messa, Suzette et al., U.S. Appl. No. 10/966,556, entitled "System for Optimization of Cost Management", filed Oct. 15, 2004.

Transaction History of U.S. Appl. No. 10/966,556, filed Oct. 15, 2004, entitled "System for Optimization of Cost Management."

Transaction History of U.S. Appl. No. 11/027,115, filed Dec. 30, 2004, entitled "Apparatus and Method to Provide Community Pricing."

Transaction History of U.S. Appl. No. 11/066,022, filed Feb. 24, 2005, entitled "System and Method for Flexible Handling of Rules and Regulations in Temporary Labor Hiring."

Transaction History of U.S. Appl. No. 11/093,615, filed Mar. 29, 2005, entitled "Cost Model Analysis and breakdown for Cost Buildup."

Transaction History of U.S. Appl. No. 11/178,033, filed Jul. 7, 2005, entitled "Flexible Policy Application to Reduce Travel Costs."

Transaction History of U.S. Appl. No. 11/187,484, filed Jul. 22, 2005, entitled "System and Method for Optimization of Group Shipments to Reduce Shipping Costs."

Transaction History of U.S. Appl. No. 11/240,740, filed Sep. 30, 2005, entitled "Method and System for Testing of Policies to Determine Cost Savings."

Transaction History of U.S. Appl. No. 11/319,911, filed Dec. 27, 2005, entitled "Method and System for Ranking Services on a Variable Scale of Compliance."

Transaction History of U.S. Appl. No. 11/324,083, filed Dec. 29, 2005, entitled "Method and System to Provide Cumulative Budget and Probabilities for A Return on Expenditure for Policy Enforcement."

Transaction History of U.S. Appl. No. 11/480,106, filed Jun. 30, 2007, entitled "Method and Systems for Personal Restaurant Assistant."

Transaction History of U.S. Appl. No. 11/549,957, filed Oct. 16, 2006, entitled "System and Method for Automatic Review of Travel Changes and Improved Suggestions and Rules Set."

Transaction History of U.S. Appl. No. 11/768,882, filed Jun. 26, 2007, entitled "System and Method for Tracking Spending Based on Reservations and Payments."

Aberdeen Group, Inc., "Xerox Scraps Paper for an Automated Expense Management Solution and Sees Multiple Millions in Return," Aberdeen Group OnSite: Best Practices, 2002.

Amadeus IT Group SA, "End to End Travel Management from Travel Booking to Expense Management," May 2, 2007.

Datasheet, Gelco Reservation Manager 2.0, Gelco Information Network, Inc., 2003.

Fair Isaac Corporation, "What's in Your Score," www.myfico.com, Feb. 9, 2005.

Farber, Dan, "Rearden Commerce Transforms Business Services," ZDNet, Feb. 27, 2005.

IBM Corporation, "IBM Introduces Electronic Expense Reporting Solution to Help Companies Eliminate Reimbursement Paper Trail" Aug. 3, 1998.

IBM Corporation, "American Express, IBM Join Forces to Offer Easy-to-Use Online Tool for Reporting, Reconciling Business Expenses," Mar. 5, 2002.

Zhu, Guangyu et al., "Extracting Relevant Named Entities for Automated Expense Reimbursement," Proceedings of the 13th ACM SIGKDD International Conference on Knowledge Discovery and Data Mining, San Jose, CA, Aug. 2007.

Business Editors, "Accenture and Captura Form Alliance to Provide Web-Enabled Expense Management Solutions," Business Wire, Aug. 13, 2001.

Extensity, Inc., "Extensity, Amadeus and e-Travel Team to Provide Integrated Travel and Expense Management Solution," Oct. 24, 2001.

* cited by examiner

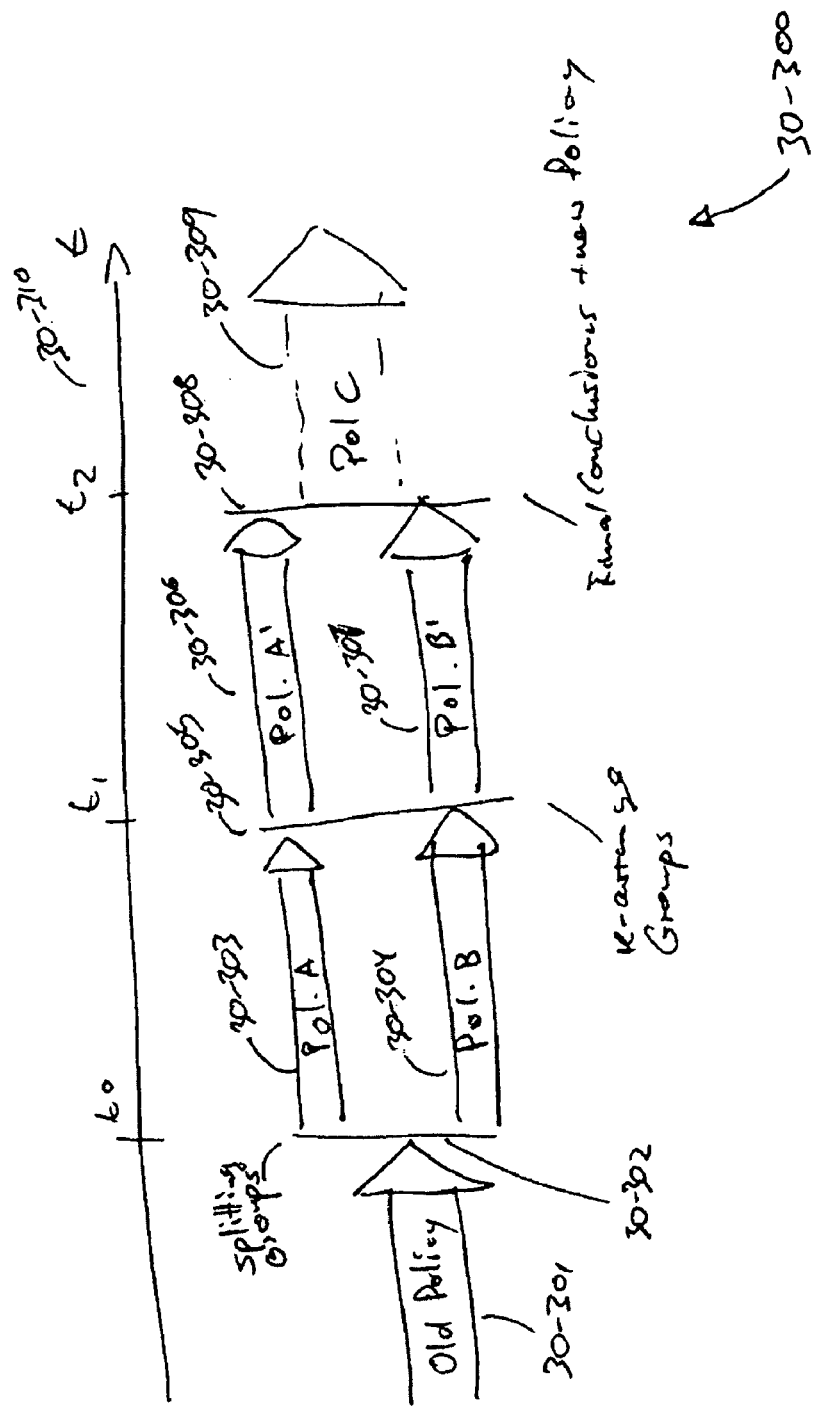

METHOD AND SYSTEM FOR TESTING OF POLICIES TO DETERMINE COST SAVINGS

The present application is filed as a continuation-in-part of "Platform for Multi-Service Procurement, Application Ser. No. 11/067,537, filed on Feb. 24, 2005, claiming priority to U.S. Application Ser. No. 11/067,537, which is also incorporated herein in its entirety by reference.

BACKGROUND OF THE INVENTION

Companies have different ways of doing business, and sometimes even each division within a corporation may have a different way of doing business. Accordingly, different ways of doing business may cause variations in the savings realized by a corporate policy, and when setting corporate policies for employee travel or other expensed employee activities, the financial effect of a certain policy, when put into practice, may not always be clear.

What is clearly needed is a system and method that allows reality-based evaluation of the financial effect, that is, the amount of savings, of a specific expense policy, when said policy is put into practice under the actual business methods and practices of a company or division of a company, instead of attempting to measure the effects of a policy on a theoretical basis or on a peer-comparison basis only

BRIEF DESCRIPTION OF FIGURES

FIG. 3 shows several phases of a review process in accordance with one embodiment.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
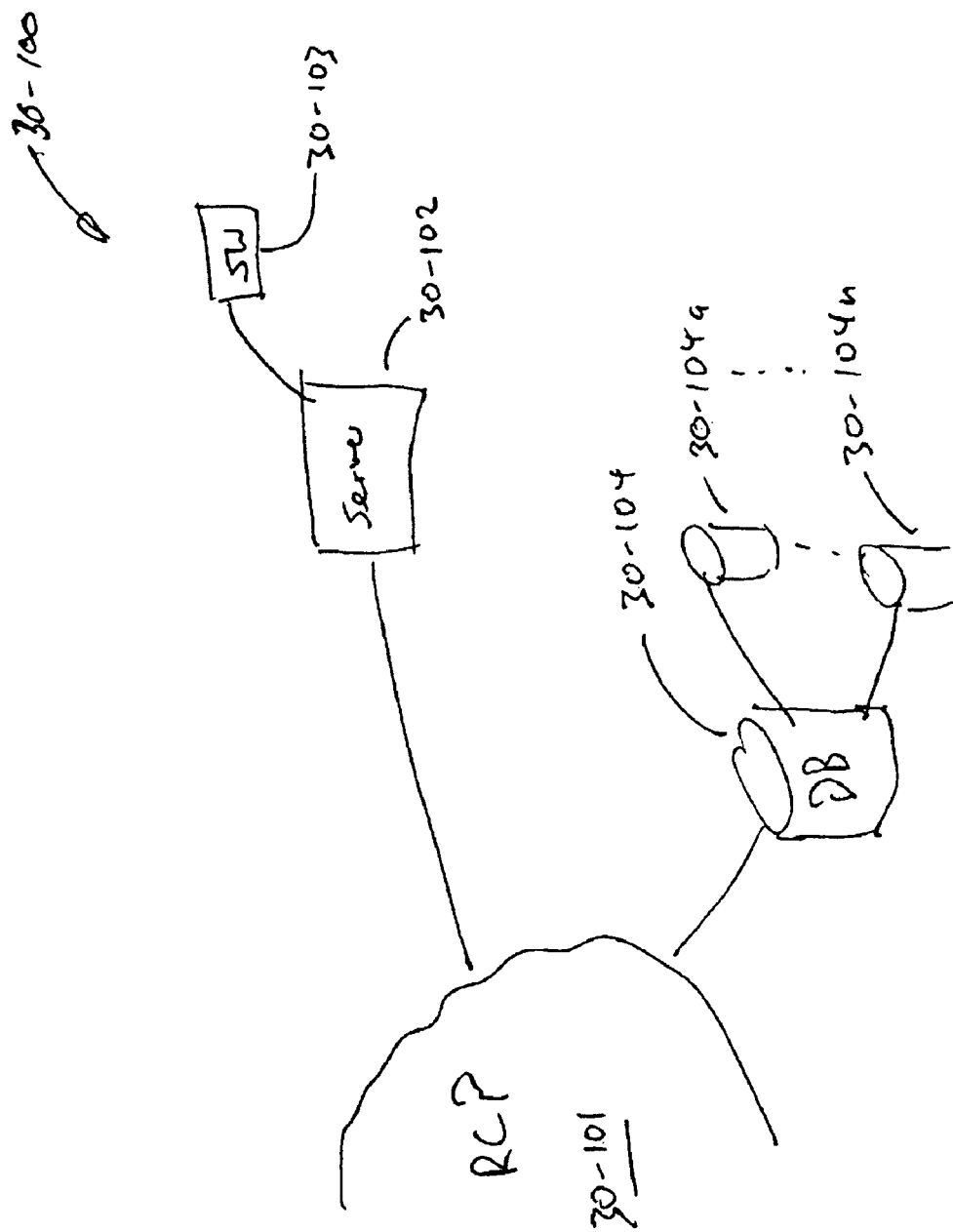
FIG. 1 shows overview of the architecture in accordance with one embodiment.

FIG. 1 shows an overview of the system 30-100 according one embodiment of Commerce Platform 30-101 connected to at least one computer server 30-102, which server is used to execute software instance 30-103, major aspects of which are described below. Also shown is a main database 30-104, which contains multiple subset databases 30-104a through 30-104n. These subset databases can be used for a particular group, for example, as described below.

Figure 2A:
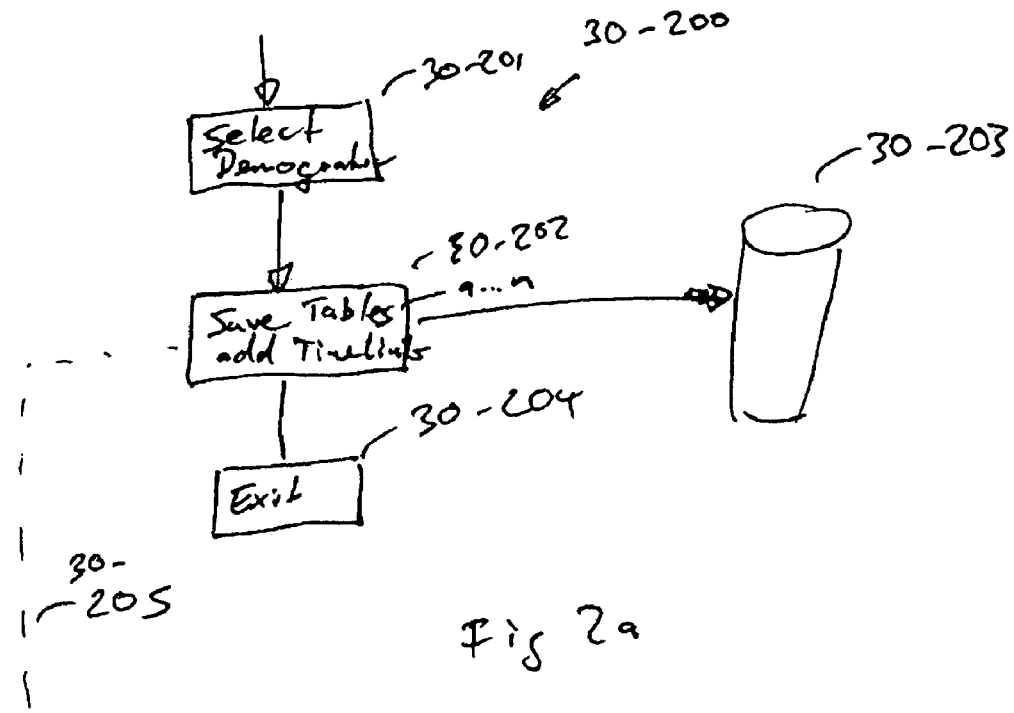
FIG. 2 shows flow diagram describing a process in accordance with one embodiment.
Figure 2B:
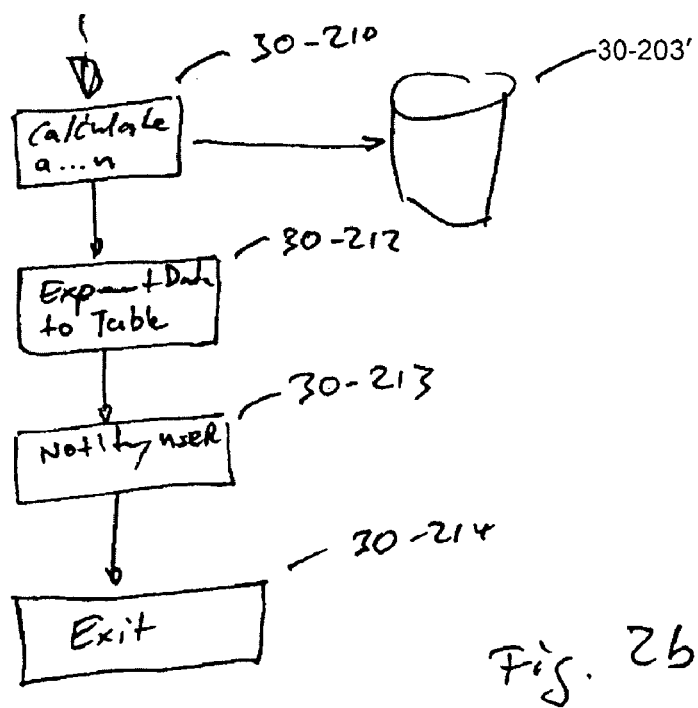

FIG. 2 shows exemplary diagrams of process flows according to the novel art of this disclosure. FIG. 2a shows the initial setup 30-200 of multiple corporate policies affecting travel and other expensed employee activities. A user, such as a travel policy manager or a system test engineer, selects employees who fit a certain demographic, such as a department, a group within a department, or a group of individual employees, all of whose expensed activities should be governed by the set of policies under scrutiny. Said policies are then assigned to the test group. Note that multiple policies may be assigned for testing, not just one or two. In step 30-202, at least two groups are assigned two different policies, but in some cases there may be substantially more policies or groups. For each policy under scrutiny a table is generated, containing the group members assigned to said policy. Also, along with defining groups and assigning policies, timetables of the timing of policy testing, reviews and notifications, etc., are input. All this data is then stored in database 30-203. Note that said database could be one of the databases 30-104a-n, or it could be spread across several of the databases 30-104a-n, or it could be a subset of any of those databases 30-04a-n. Once the setup of the policy testing has been completed, the user may exit the process 30-200 in step 30-204. A dotted line 30-205 shows the timed interval defined in step 30-202 between initial setup 30-200 and the process described in FIG. 2b. Once the interval has elapsed, the program begins the process shown in FIG. 2b. In step 30-210 the program calculates the actual travel cost for each group a-n and then saves the cost information into a database 30-203', which in some cases may be the same as database 30-203 or in other cases may be a separate database, for use in calculating the total cost for each plan when totals for each group are added up for comparison, (see the discussion of FIG. 3). In step 30-212 the program exports the data to a table and then in step 30-213 it notifies the tester of the availability of the table, or, alternatively, it may, for example, email the table in a usable format (e.g., a spreadsheet) to the user. After completing the testing and user notification, in step 30-214 the program terminates.

FIG. 3 shows several phases of a review process 30-300. The process timeline 30-310, at the top of the figure, has three exemplary time points, t0, t1, and t2. A test group defined by running setup program 30-203 uses an old policy 30-301 during the timed interval 30-205, up to time point t0 30-202, at which point the test group is split into users of Policy A 30-303 and users of Policy B 30-304. After a preset time, for example one month, the process reaches time line t1 30-305, at which the results of the policy usage are reviewed. Totals for each group are added up, for comparison, using data stored in database 30-203' (or the respective database that was used). Analysis of said results may cause redefining or resetting groups or policies at (accomplished by rerunning the setup program 30-203). Then those new policies, Policy A' 30-306 and Policy B' 30-307, may be left running for another period of time until time point t2 30-308. At this point results are again reviewed and after analysis, the preferred policy is selected and Policy C 30-309 is put into place as a new company policy. It is clear that in some cases this process may be an ongoing review process that is used to fine tune existing policies, instead of consisting of a set number of reviews to test and select new policies. Also, as noted above, there may be many more policies and test groups than simply two, for example, in conjunction with certain offers and trials from services providers, such as airlines, hotels, etc. The difference from theoretical calculations is that all the actual costs are integrated into the comparison results, thus producing more accurate data and test results.

It is clear that many modifications and variations of this embodiment may be made by one skilled in the art without departing from the spirit of the novel art of this disclosure.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

It is clear that many modifications and variations of this embodiment may be made by one skilled in the art without departing from the spirit of the novel art of this disclosure.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

What is claimed is:

1. A computer-implemented method comprising:
   receiving, at a computer server, identities of a set of one or more persons associated within an organization, wherein the one or more person's travel related expenditures are governed by at least a first and second policy;
   from the set of one or more persons, the computer server identifying a first group governed by the first policy and identifying a second group governed by the second policy;
   identifying, at the computer server, the travel costs incurred by the first group and the travel costs incurred by the second group; and
   following the passage of a predetermined length of time, the computer server performing a cost analysis and identifying a cost savings achieved by the first policy, based on travel costs incurred by the first group during the predetermined length of time, and identifying a cost savings achieved by the second policy, based on travel costs incurred by the second group during the predetermined length of time.

2. The method of claim 1, wherein the one or more persons are to be selected from a predetermined demographic.

3. The method of claim 2, wherein the identifying the first and second group includes identifying the first group governed by multiple policies, and identifying the second group governed by multiple policies.

4. The method of claim 3, wherein the multiple policies governing the first group are separate from the multiple policies governing the second group.

5. The method of claim 1, further comprising receiving the predetermined length of time as a user entry.

6. The method of claim 1, wherein the identifying the first and second group includes identifying a third or more groups governed by policies.

7. The method of claim 1, wherein the first and second policies are associated with travel related expenses.

8. The method of claim 1, wherein in response to the performing a cost analysis on travel costs incurred by the first group during the predetermined length of time and travel costs incurred by the second group during the predetermined length of time, redefining at least one of the first group, the second group, the first policy, and the second policy.

9. The method of claim 8, further comprising identifying the travel costs incurred by the first group and the travel costs incurred by the second group; and
   following the passage of a predetermined second length of time, in view of the respective separate policies, performing a cost analysis on travel costs incurred by the first group during the predetermined second length of time and travel costs incurred by the second group during the predetermined second length of time.

10. A machine-readable medium having stored thereon a set of instructions which when executed by a computer server, perform a method comprising:
    receiving, at the computer server, identities of a set of one or more persons associated within an organization, wherein the one or more person's travel related expenditures are governed by at least a first and second policy;
    from the set of one or more persons, the computer server identifying a first group governed by the first policy and identifying a second group governed by the second policy;
    identifying, at the computer server, the travel costs incurred by the first group and the travel costs incurred by the second group; and
    following the passage of a predetermined length of time, the computer server performing a cost analysis and identifying a cost savings achieved by the first policy, based on travel costs incurred by the first group during the predetermined length of time, and identifying a cost savings achieved by the second policy, based on travel costs incurred by the second group during the predetermined length of time.

11. The machine-readable medium of claim 10, wherein the one or more persons are to be selected from a predetermined demographic.

12. The machine-readable medium of claim 11, wherein the identifying the first and second group includes identifying the first group governed by multiple policies, and identifying the second group governed by multiple policies.

13. The machine-readable medium of claim 12, wherein the multiple policies governing the first group are separate from the multiple policies governing the second group.

14. The machine-readable medium of claim 10, further comprising receiving the predetermined length of time as a user entry.

15. The machine-readable medium of claim 10, wherein the identifying the first and second group includes identifying a third or more groups governed by policies.

16. The machine-readable medium of claim 10, wherein the first and second policies are associated with travel related expenses.

17. The machine-readable medium of claim 10, wherein in response to the performing a cost analysis on travel costs incurred by the first group during the predetermined length of time and travel costs incurred by the second group during the predetermined length of time, redefining at least one of the first group, the second group, the first policy, and the second policy.

18. The machine-readable medium of claim 17, further comprising identifying the travel costs incurred by the first group and the travel costs incurred by the second group; and
    following the passage of a predetermined second length of time, in view of the respective separate policies, performing a cost analysis on travel costs incurred by the first group during the predetermined second length of time and travel costs incurred by the second group during the predetermined second length of time.

19. A system comprising:

means for receiving, at a computer server, identities of a set of one or more persons associated within an organization, wherein the one or more person's travel related expenditures are governed by at least a first and second policy;

means for identifying, by the computer server, from the set of one or more persons, a first group governed by the first policy and a second group governed by the second policy;

means for identifying, by the computer server, the travel costs incurred by the first group and the travel costs incurred by the second group; and means for performing, by the computer server, following the passage of a predetermined length of time, a cost analysis and identifying a cost savings achieved by the first policy, based on travel costs incurred by the first group during the predetermined length of time, and identifying a cost savings achieved by the second policy, based on travel costs incurred by the second group during the predetermined length of time.

* * * * *